(12) United States Patent
Nemoto

(10) Patent No.: US 9,014,932 B2
(45) Date of Patent: Apr. 21, 2015

(54) AUTOMATIC TRANSMISSION

(71) Applicant: Honda Motor Co., Ltd., Tokyo (JP)

(72) Inventor: Yoshikazu Nemoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/178,642

(22) Filed: Feb. 12, 2014

(65) Prior Publication Data

US 2014/0244121 A1 Aug. 28, 2014

(30) Foreign Application Priority Data

Feb. 25, 2013 (JP) ................. 2013-034173

(51) Int. Cl.
*B60W 10/02* (2006.01)
*B60W 10/06* (2006.01)
*B60W 10/113* (2012.01)
*F16H 61/68* (2006.01)

(52) U.S. Cl.
CPC .............. *F16H 61/68* (2013.01); *B60W 10/02* (2013.01); *B60W 10/06* (2013.01); *B60W 10/113* (2013.01)

(58) Field of Classification Search
CPC ... B60W 10/02; B60W 10/06; B60W 10/113; B60W 2510/0208; B60W 2510/0666; B60W 2710/021; F16H 2059/6807; F16H 59/74; F16H 2061/0406; F16H 61/68
USPC .......................................................... 701/58
See application file for complete search history.

(56) References Cited

U.S. PATENT DOCUMENTS

| | | | |
|---|---|---|---|
| 5,086,666 A * | 2/1992 | Moriki ......................... | 477/109 |
| 2008/0064554 A1* | 3/2008 | Tsukada et al. ............... | 475/218 |
| 2011/0185847 A1* | 8/2011 | Tanba et al. .................... | 74/661 |
| 2012/0316028 A1* | 12/2012 | Kobayashi et al. ............... | 477/5 |

FOREIGN PATENT DOCUMENTS

| JP | 2008-180320 A | 8/2008 |
|---|---|---|
| JP | 4242189 B2 | 3/2009 |

* cited by examiner

*Primary Examiner* — Edwin A Young
(74) *Attorney, Agent, or Firm* — Westerman, Hattori, Daniels & Adrian, LLP

(57) ABSTRACT

An automatic transmission capable of improving stability and reliability of connection operation of a synchronization mechanism when pre-shift control is executed, thereby making it possible to prolong the service life of the mechanism and improve marketability thereof. To change the speed position of a vehicle, one of two power transmission paths from an internal combustion engine to drive wheels is switched to the other, and pre-shift control is executed before switching the path. In doing this, when conditions for executing the pre-shift control are satisfied, whether or not a motive power fluctuation state of the engine occurs after satisfaction of the execution conditions is determined. If the motive power fluctuation state occurs, delay control for delaying the start of the pre-shift control is executed, whereas if the same does not occur, the pre-shift control is executed without executing the delay control.

16 Claims, 6 Drawing Sheets

AUTOMATIC TRANSMISSION

BACKGROUND OF THE INVENTION

1. Field of the Invention

The present invention relates to an automatic transmission which transmits a motive power of a prime mover to driven parts by switching between one and the other of two power transmission paths, and executes pre-shift control when executing switching between the power transmission paths.

2. Description of the Related Art

Conventionally, an automatic transmission for a vehicle is known as disclosed in Japanese Laid-Open Patent Publication (Kokai) No. 2008-180320. This automatic transmission transmits motive power of an engine to wheels while changing the speed of the motive power, by switching between one and the other of two power transmission paths, and also executes pre-shift control when executing switching between the power transmission paths. The automatic transmission is a five-speed transmission, and includes a first input shaft and a second input shaft which are connected to the engine via a first clutch and a second clutch, respectively, an output shaft connected to the wheels, first to fifth driven gears relatively rotatably provided on the output shaft, three synchronization mechanisms which connect the driven gears to the output shaft while synchronizing the driven gears with the output shaft, three drive gears concentrically fixed to the first input shaft and in constant mesh with three odd-numbered driven gears, and two drive gears concentrically fixed to the second input shaft and in constant mesh with two even-numbered driven gears.

The automatic transmission executes pre-shift control, as shown in FIG. 3 in Japanese Laid-Open Patent Publication (Kokai) No. 2008-180320. In the pre-shift control, in a state in which the motive power of the engine is transmitted to the wheels via one of the two power transmission paths, while holding a clutch for the other power transmission path in a disengaged state, one of the synchronization mechanisms, which is associated with the other power transmission path, connects beforehand between one of the driven gears forming the other power transmission path and the output shaft. As shown in FIG. 3 in Japanese Laid-Open Patent Publication (Kokai) No. 2008-180320, a target speed position is set in a step 301, and in a step 302, the associated synchronization mechanism is driven to connect a driven gear for the set target speed position to the output shaft while synchronizing the same with the output shaft. Then, in a step 303, it is determined whether or not the connection of the driven gear for the target speed position to the output shaft is successful. If the connection of the driven gear for the target speed position to the output shaft has failed, the connection operation by the synchronization mechanism is cancelled in a step 304, and engagement control of a clutch between an input shaft associated with the other power transmission path and the engine is performed in a step 305, followed by terminating the pre-shift control.

Further, the present applicant has proposed a synchronization mechanism in the Publication of Japanese Patent No. 4242189. This synchronization mechanism connects a transmission gear to a rotating shaft while synchronizing the transmission gear with the rotating shaft, and includes an actuator, a sleeve, a blocking ring, a synchronization spring, and so forth. In this synchronization mechanism, when the sleeve is driven by the actuator, spline teeth of the sleeve press the blocking ring toward the transmission gear via the synchronization spring. This generates frictional forces between the blocking ring and the transmission gear, to rotate an outer ring of the blocking ring, whereby the spline teeth of the sleeve are brought into contact with ring gear teeth of the blocking ring. As a consequence, the sleeve is synchronized with the blocking ring, and then the spline teeth of the sleeve are in mesh with dog teeth, whereby the transmission gear is connected to the rotating shaft.

In general, in the case of an automotive vehicle using an engine as a motive power source, when engine torque is rapidly increased by a stepping-on operation of the accelerator pedal by a driver, a reaction force is generated by frictional resistance between wheels of the vehicle and a road surface. This reaction force makes torque fluctuation liable to occur on the output shaft, since the output shaft is connected to the wheels. When torque fluctuation occurs on the output shaft as described above, according to the above-described conventional automatic transmission, since one output shaft is shared by the two power transmission paths, one of the synchronization mechanism executing the pre-shift control sometimes fails in connecting the driven gear for the target speed position to the output shaft or suffers from temporary failure of synchronization.

When the connection operation by the synchronization mechanism has failed as described above, the connection operation has to be executed again after engagement of the clutch. This can cause an increase in the number of times of execution of the connection operation, causing shortening of the service life of the synchronization mechanism. Further, when such a synchronization mechanism as proposed in the Publication of Japanese Patent No. 4242189 is used as the synchronization mechanism described above, if the synchronization mechanism suffers from temporary failure of synchronization, the spline teeth of the synchronization sleeve and the ring gear teeth of the blocking ring can hit against each other to produce gear noise. In this case, the service life of the synchronization mechanism is shortened and marketability is degraded.

SUMMARY OF THE INVENTION

It is an object of the present invention to provide an automatic transmission which is capable of improving stability and reliability of the connection operation of a synchronization mechanism when pre-shift control is executed, thereby making it possible to prolong a service life of the synchronization mechanism, and improve marketability thereof.

To attain the above object, the present invention provides an automatic transmission including a plurality of first rotating shafts including an input-side first rotating shaft to which motive power is input from a prime mover, a plurality of first transmission gear trains that are provided on the plurality of first rotating shafts, for forming a first power transmission path for transmitting the motive power from the prime mover to driven parts, in cooperation with the plurality of first rotating shafts, the plurality of first transmission gear trains setting a plurality of speed positions, respectively, a first synchronization mechanism that connects between one transmission gear out of the plurality of first transmission gear trains and one rotating shaft out of the plurality of first rotating shafts with each other while synchronizing the one transmission gear and the one rotating shaft with each other, thereby making it possible to transmit the motive power from the prime mover to the driven parts via the first power transmission path while changing a speed of the motive power, and releases the connection between the one transmission gear and the one rotating shaft, a first clutch that connects and disconnects between the prime mover and the input-side first rotating shaft, a plurality of second rotating shafts including an input-side second rotating shaft to which the motive power is input from the prime mover, a plurality of second transmission gear trains that are provided on the plurality of second rotating shafts, for forming a second power transmission path for transmitting the motive power from the prime mover to the driven parts, which is different from the first power transmission path, in cooperation with the plurality of second rotating shafts, the plurality of second transmission gear trains setting a plurality of speed positions, respectively, a second synchronization mechanism that connects between one transmission gear of the plurality of second transmission gear trains and one rotating shaft of the plurality of second rotating shafts with each other while synchronizing the one transmission gear and the one rotating shaft with each other, thereby making it possible to transmit the motive power from the prime mover to the driven parts via the second power transmission path while changing a speed of the motive power, and releases the connection between the one transmission gear and the one rotating shaft, a second clutch that connects and disconnects between the prime mover and the input-side second rotating shaft, and control means for setting a power transmission path for transmitting the motive power from the prime mover to the driven parts, to one of the first power transmission path and the second power transmission path, by controlling one of the first clutch and the second clutch to an engaged state and the other of the first clutch and the second clutch to a disengaged state, and controlling one of the first synchronization mechanism and the second synchronization mechanism to a connecting state and the other of the first synchronization mechanism and the second synchronization mechanism to a releasing state, the control means performing, to change a speed position, switching control for switching the power transmission path from the one to the other of the first power transmission path and the second power transmission path, by switching between the engaged state and the disengaged state of the one and the other of the first clutch and the second clutch and between the connecting state and the releasing state of the one and the other of the first synchronization mechanism and the second synchronization mechanism, and executing, when performing the switching control, pre-shift control in which while holding the one clutch in the engaged state, the one synchronization mechanism in the connecting state, and the other clutch in the disengaged state, the other synchronization mechanism is caused to shift from the releasing state to the connecting state, wherein the control means comprises execution condition-determining means for determining whether or not execution conditions for executing the pre-shift control are satisfied, before executing the switching control, motive power fluctuation-causing condition-determining means for determining, based on a result of determination by the execution condition-determining means, when the execution conditions for executing the pre-shift control are satisfied, whether or not there are satisfied motive power fluctuation-causing conditions from which a predetermined motive power fluctuation state of the prime mover is estimated to occur after satisfaction of the executing conditions, and pre-shift control execution means for performing, based on a result of determination by the motive power fluctuation-causing condition-determining means, to execute delay control for delaying a start of the pre-shift control when the motive power fluctuation-causing conditions are satisfied, and to start the pre-shift control without executing the delay control when the motive power fluctuation-causing conditions are not satisfied.

With the configuration of this automatic transmission, the power transmission path for transmitting the motive power from the prime mover to the driven parts is set to one of the first and second power transmission paths by controlling one of the first and second clutches to the engaged state and the other of the first and second clutches to the disengaged state, and controlling one of the first and second synchronization mechanisms to the connecting state and the other of the first and second synchronization mechanisms to the releasing state. Further, to change a speed position, the switching control for switching the power transmission path from the one to the other of the first and second power transmission paths is executed by switching between the engaged state and the disengaged state of the one and the other of the first and second clutches and between the connecting state and the releasing state of the one and the other of the first and second synchronization mechanisms, and when performing the switching control, the pre-shift control is executed in which while holding the one clutch in the engaged state, the one synchronization mechanism in the connecting state, and the other clutch in the disengaged state, the other synchronization mechanism is caused to shift from the releasing state to the connecting state.

Further, before executing the switching control, it is determined whether or not the execution conditions for executing the pre-shift control are satisfied, and when the execution conditions are satisfied, it is determined whether or not there are satisfied the motive power fluctuation-causing conditions from which a predetermined motive power fluctuation state of the prime mover is estimated to occur after satisfaction of the executing conditions. Further, when the motive power fluctuation-causing conditions are satisfied, the delay control for delaying a start of the pre-shift control is executed, whereas when the motive power fluctuation-causing conditions are not satisfied, the pre-shift control is started without executing the delay control.

As described above, when the motive power fluctuation-causing conditions are satisfied, and it is estimated that the predetermined motive power fluctuation state of the motive power will occur, the delay control for delaying the start of the pre-shift control is executed. Therefore, by properly setting the execution time period over which the delay control is to be executed, it is possible to start the pre-shift control at the timing at which the fluctuation of the motive power in the predetermined motive power fluctuation state has converged. This makes it possible to avoid occurrence of synchronization failure, thereby making it possible to improve the stability and reliability of the connection operation of the synchronization mechanism during the pre-shift control. Further, it is possible to prevent gear teeth hitting and gear noise from being caused by synchronization failure, whereby it is possible to prolong the service life of the synchronization mechanism, thereby making it possible to enhance marketability. On the other hand, when the motive power fluctuation-causing conditions are not satisfied, and it is estimated that the predetermined motive power fluctuation state of the prime mover will not occur, the pre-shift control is started without executing the delay control, so that it is possible to shorten a time period required for the shift operation of the automatic transmission, thereby making it possible to enhance the marketability thereof.

Preferably, the pre-shift control execution means includes convergence time period-calculating means for calculating a convergence time period to be taken before convergence of rotation fluctuation which is caused in the other of the first power transmission path and the second power transmission path by occurrence of the predetermined motive power fluctuation state, when the motive power fluctuation-causing conditions are satisfied, and execution time period-determining means for determining, based on the convergence time period, an execution time period over which the delay control is to be executed.

With the configuration of the preferred embodiment, when the motive power fluctuation-causing conditions are satisfied, the convergence time period taken before convergence of the rotation fluctuation which is caused in the other of the first and second power transmission paths by occurrence of the predetermined motive power fluctuation state is calculated, and the execution time period over which the delay control is to be executed is determined based on the calculated convergence time period, and therefore it is possible to start the pre-shift control in proper timing when the fluctuation of the motive power in the predetermined motive power fluctuation state has converged. This makes it possible to further improve the stability and reliability of the connection operation of the synchronization mechanism during the pre-shift control, thereby making it possible to further prolong the service life of the synchronization mechanism.

More preferably, the pre-shift control execution means further includes motive power difference-calculating means for calculating a motive power difference which is a difference between a first motive power estimated to be generated by the prime mover immediately after satisfaction of the execution conditions for executing the pre-shift control, and a second motive power generated by the prime mover immediately before satisfaction of the execution conditions for executing the pre-shift control, and wherein the convergence time period-calculating means calculates the convergence time period based on the motive power difference.

With the configuration of the preferred embodiment, the convergence time period taken before convergence of the rotation fluctuation which is caused in the other of the first and second power transmission paths by occurrence of the predetermined motive power fluctuation state is calculated based on the motive power difference, which is the difference between the first motive power and the second motive power. In this case, the first motive power is a motive power estimated to be generated by the prime mover immediately after satisfaction of the execution conditions for executing the pre-shift control, and the second motive power is a motive power generated by the prime mover immediately before satisfaction of the execution conditions for executing the pre-shift control, and hence the motive power difference, which is the difference between the first and second motive powers, is calculated as a value accurately indicating the degree of occurrence of motive power fluctuation of the prime mover during execution of the pre-shift control. Therefore, by calculating the convergence time period using the value calculated as above, it is possible to enhance reliability of the convergence time period and properly determine a just enough length of the execution time period over which the delay control is to be executed.

Further preferably, the prime mover is installed on a vehicle, and the driven parts are wheels of the vehicle, the automatic transmission further including vehicle speed-detecting means for detecting a vehicle speed, which is a speed of the vehicle, wherein the convergence time period-calculating means calculates the convergence time period based on not only the motive power difference but also the vehicle speed.

In general, it is known that under the condition of low vehicle speed, the power transmission paths of the vehicle are susceptible to a change in motive power of the prime mover, which makes the rotation fluctuation liable to occur, whereas under the condition of high vehicle speed, the power transmission paths are unsusceptible to a change in the motive power, which makes the rotation fluctuation difficult to occur. On the other hand, with the configuration of the preferred embodiment, the convergence time period taken before convergence of the rotation fluctuation which is caused in the other of the first and second power transmission paths is calculated based on not only the motive power difference but also the vehicle speed, and hence it is possible to calculate the convergence time period while causing a state of occurrence of rotation fluctuation caused by the adverse influence of the change in the motive power of the prime mover to be properly reflected thereon, whereby it is possible to improve the calculation accuracy of the convergence time period. This makes it possible to more properly calculate execution time period over which the delay control process is to be executed.

Preferably, the pre-shift control execution means further includes deviation degree parameter-detecting means for detecting a deviation degree parameter indicative of a degree of deviation between a rotational speed of the one transmission gear and a rotational speed of the one rotating shaft when the other synchronization mechanism is in the releasing state, and first permission means for performing, in a case where the motive power fluctuation-causing conditions are satisfied, to permit execution of the delay control, when the degree of deviation indicated by the deviation degree parameter is larger than a predetermined degree, and to inhibit execution of the delay control and permit execution of the pre-shift control, when the degree of deviation indicated by the deviation degree parameter is not larger than the predetermined degree.

With the configuration of the preferred embodiment, when the other synchronization mechanism is in the releasing state, the deviation degree parameter indicative of the degree of deviation between the rotational speed of the one transmission gear and the rotational speed of the one rotating shaft is detected. When the motive power fluctuation-causing conditions are satisfied, if the degree of deviation indicated by the deviation degree parameter is larger than the predetermined degree, the execution of the delay control is permitted, whereas if the degree of deviation indicated by the deviation degree parameter is not larger than the predetermined degree, the execution of the delay control is inhibited and the execution of the pre-shift control is permitted. In this case, when the motive power fluctuation-causing conditions are satisfied and the predetermined motive power fluctuation state is estimated to occur, if the degree of deviation between the rotational speed of the one transmission gear and the rotational speed of the one rotating shaft is large, the synchronization failure is liable to occur when the one transmission gear and the one rotating shaft are connected by the other synchronization mechanism. On the other hand, if the degree of deviation is small, the synchronization failure is not liable to occur. Therefore, when the synchronization failure is liable to occur, the delay control is executed, whereas when the synchronization failure is not liable to occur, the execution of the delay control is inhibited and the pre-shift control is immediately executed, whereby while avoiding occurrence of synchronization failure, it is possible to shorten the time period required for the shift operation of the automatic transmission, thereby making it possible to enhance the marketability (Note that throughout the specification, "to detect the deviation degree parameter" is not limited to direct detection of the deviation degree parameter using a sensor or the like, but its meaning is intended to include calculation of the value of the deviation degree parameter based on a parameter other than the deviation degree parameter).

Preferably, a plurality of odd-numbered speed positions are set by one of the plurality of first transmission gear trains and the plurality of second transmission gear trains, and a plurality of even-numbered speed positions are set by the other of the plurality of first transmission gear trains and the plurality of second transmission gear trains, respectively, and the pre-shift control execution means further includes second permission means for performing, when the motive power fluctuation-causing conditions are satisfied, to permit execution of the delay control when a down-shifting speed position change demand for downshifting by n speed positions (n is an odd number equal to or larger than 3) has occurred, but otherwise to inhibit execution of the delay control and permit execution of the pre-shift control.

With the configuration of the preferred embodiment, when the motive power fluctuation-causing conditions are satisfied and the predetermined motive power fluctuation state is estimated to occur, if a down-shifting speed position change demand for downshifting by n speed positions (n is an odd number equal to or larger than 3) has occurred, that is, if conditions are such that the synchronization failure caused by a change in the motive power of the prime mover is liable to occur since the number of speed positions across which a downshift is to be executed is large, the delay control process is executed. On the other hand, in the other cases, i.e. when the synchronization failure caused by a change in the motive power of the prime mover is not liable to occur since the number of speed positions across which the downshift is to be executed is small or an upshift is demanded, the pre-shift control process is immediately executed without executing the delay control. This makes it possible to shorten the time period required for the shift operation while avoiding occurrence of synchronization failure, thereby making it possible to further improve the marketability.

The above and other objects, features, and advantages of the present invention will become more apparent from the following detailed description taken in conjunction with the accompanying drawings.

DETAILED DESCRIPTION OF PREFERRED EMBODIMENTS

Figure 1:
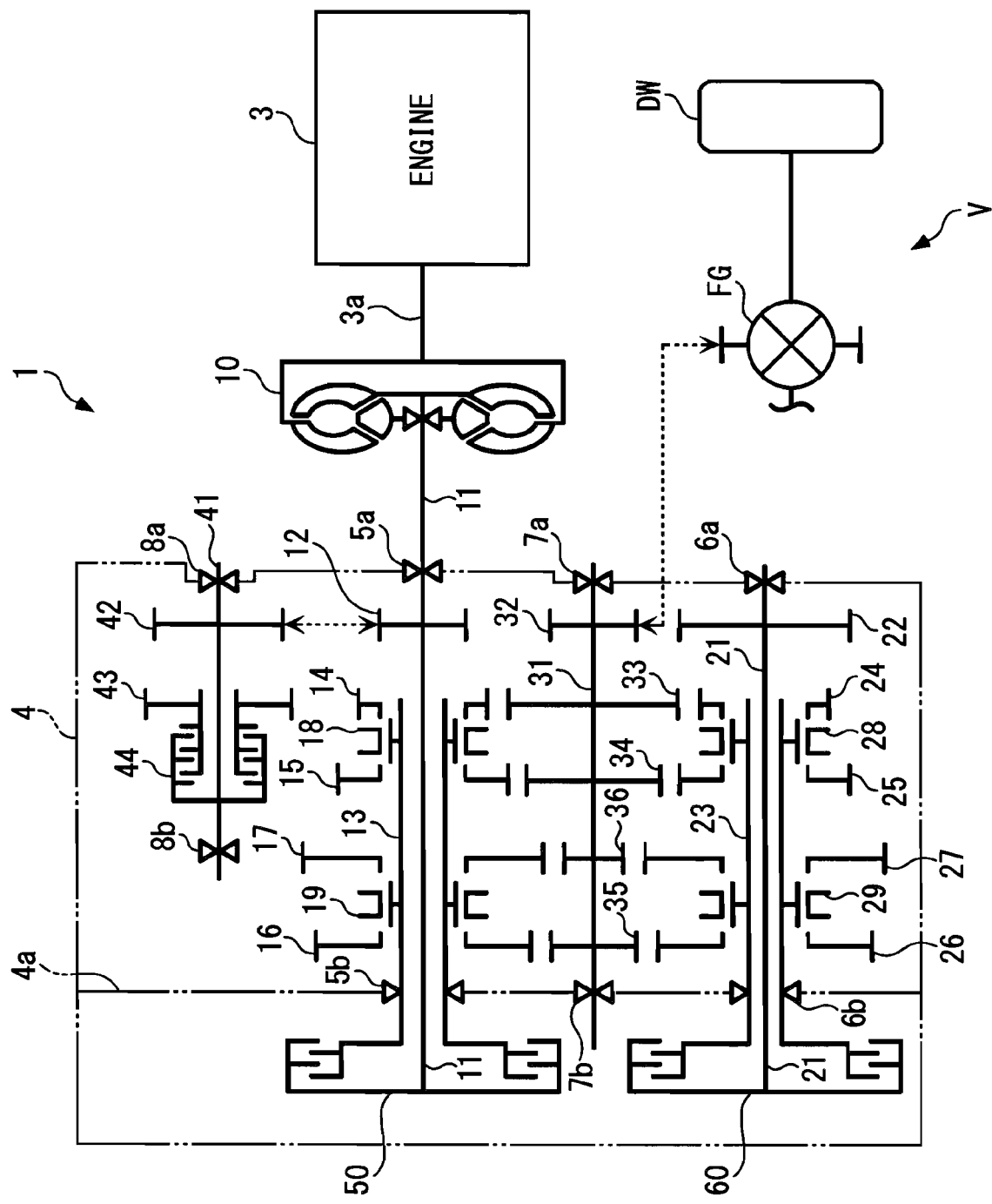
FIG. 1 is a schematic diagram of an automatic transmission according to an embodiment of the present invention and a drive system of a vehicle to which the automatic transmission is applied.

Hereafter, an automatic transmission 1 according to an embodiment of the invention will be described with reference to drawings. As shown in FIG. 1, the automatic transmission 1 according to the present embodiment is applied to a drive system of a vehicle V. This vehicle V is a four-wheel vehicle, and comprises an internal combustion engine (hereinafter referred to the "engine") 3 as a prime mover, a pair of drive wheels DW (only one of which is shown) as driven parts, and a pair of driven wheels (not shown).

Further, the automatic transmission 1 is a dual-clutch type automatic transmission, and comprises a torque converter 10, a transmission case 4, and a first input shaft 11, a second input shaft 21, an output shaft 31, and a reverse shaft 41, which are arranged in the transmission case 4 in parallel with each other, as well as an ECU 2 (see FIG. 2) that executes various control processes, such as a transmission control process, described hereinafter.

The torque converter 10 is disposed between a crankshaft 3a of the engine 3 and the first input shaft 11, and connects between them. The torque converter 10 includes a lockup clutch (not shown), and a lockup clutch actuator 70 (see FIG. 2) which drives the lockup clutch. The lockup clutch actuator 70 is electrically connected to the ECU 2. The ECU 2 causes engagement and disengagement of the lockup clutch by controlling the lockup clutch actuator 70.

In the case of this torque converter 10, during disengagement of the lockup clutch, the rotational speed of the crankshaft 3a is changed and transmitted to the first input shaft 11, whereas during engagement of the lockup clutch, the rotational speed of the crankshaft 3a is directly transmitted to the first input shaft 11.

Further, the transmission case 4 has its inner space partitioned into two chambers, i.e. a transmission chamber and a clutch chamber, by a partition wall 4a. The transmission chamber accommodates various types of transmission gears, referred to hereinafter, and the clutch chamber accommodates first and second clutches 50 and 60.

Furthermore, the output shaft 31 is rotatably supported by the transmission case 4 via two bearings 7a and 7b. Arranged on the output shaft 31 are an output gear 32, a first-second speed driven gear 33, a third-fourth speed driven gear 34, a seventh-eighth speed driven gear 36, and a fifth-sixth speed driven gear 35 at respective locations in the mentioned order from a location toward the torque converter 10 to a location toward the first clutch 50. Each of the five gears 32 to 36 is concentrically fixed to the output shaft 31. Further, the output gear 32 is in constant mesh with a gear of a final reduction gear box FG, whereby the rotation of the output shaft 31 is transmitted to the drive wheels DW via the final reduction gear box FG. Note that in the present embodiment, the four driven gears 33 to 36 correspond to first transmission gears and second transmission gears.

Figure 2:
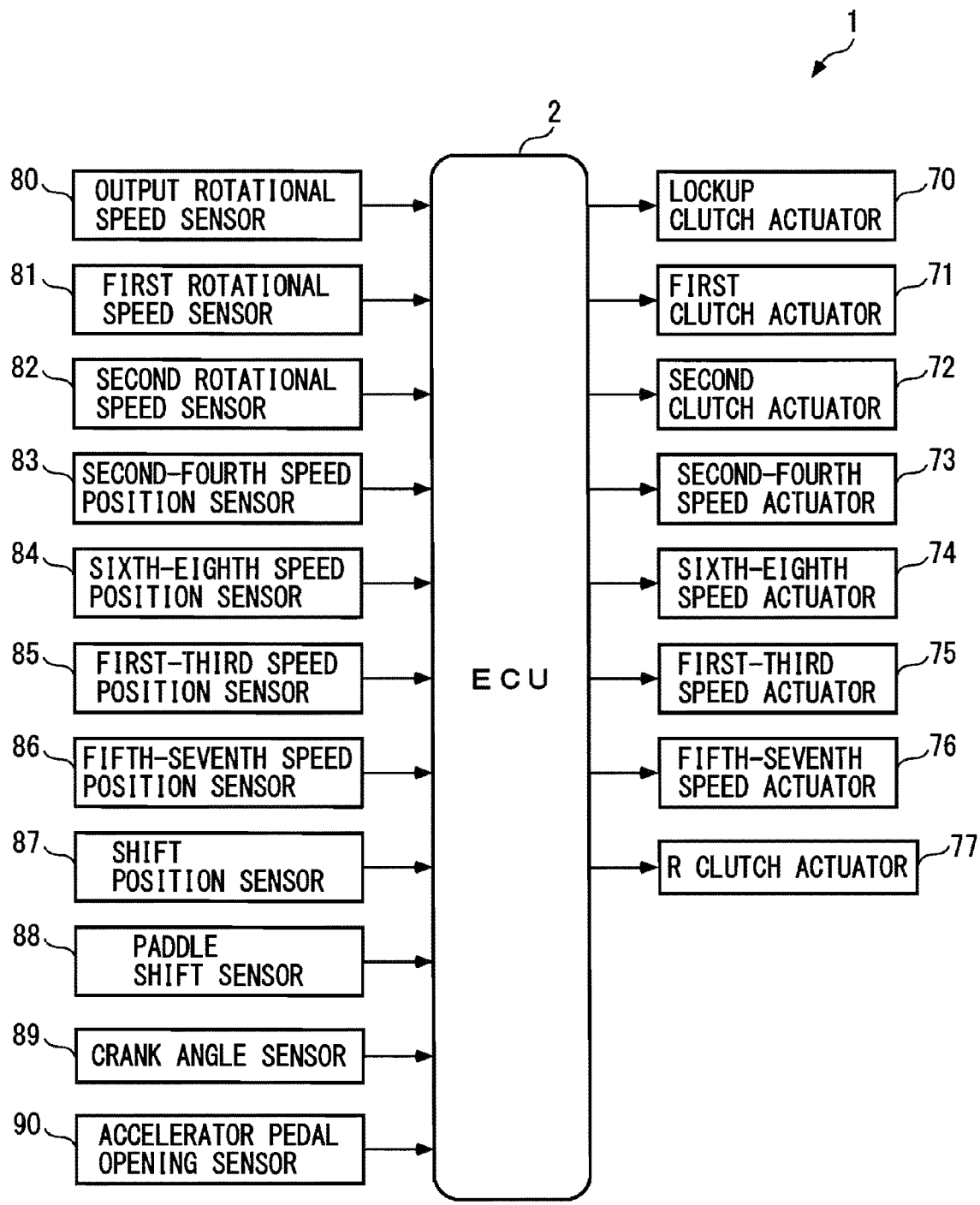
FIG. 2 is an electrical block diagram of the automatic transmission.

Further, an output rotational speed sensor 80 is disposed in the vicinity of the output shaft 31 (see FIG. 2). The output rotational speed sensor 80 detects an output rotational speed NC, which is the rotational speed of the output shaft 31, and delivers a signal indicative of the detected output rotational speed NC to the ECU 2. The ECU 2 calculates a vehicle speed VP, which is the speed of the vehicle V, and a target gear speed Ng, referred to hereinafter, and so forth, based on the detection signal from the output rotational speed sensor 80. Note that in the present embodiment, the output rotational speed sensor 80 corresponds to vehicle speed-detecting means and deviation degree parameter-detecting means.

On the other hand, the above-mentioned first input shaft 11 is rotatably supported by the transmission case 4 via two bearings 5a and 5b. The torque converter 10 is connected to one end of the first input shaft 11, and the first clutch 50 is connected to the other end thereof. The first input shaft 11 is provided with a first input gear 12 and a first rotating shaft 13. The first input gear 12 is concentrically fixed to a portion of the first input shaft 11, at a location closer to the torque converter 10 than the first rotating shaft 13 is, and is in constant mesh with a reverse driven gear 42.

The first rotating shaft 13 (input-side first rotating shaft), which is hollow, has an inner hole thereof rotatably fitted on the first input shaft 11, and is rotatably supported by the transmission case 4 via the bearing 5b. Further, a first rotational speed sensor 81 (deviation degree parameter-detecting means) is disposed in the vicinity of the first rotating shaft 13. The first rotational speed sensor 81 detects a first rotational speed N1, which is the rotational speed of the first rotating shaft 13, and delivers a signal indicative of the detected first rotational speed N1 to the ECU 2.

Furthermore, a second speed drive gear 14, a second-fourth speed synchronization mechanism 18, a fourth speed drive gear 15, an eighth speed drive gear 17, a sixth-eighth speed synchronization mechanism 19, and a sixth speed drive gear 16 are provided on the first rotating shaft 13 at respective locations in the mentioned order from a location toward the torque converter 10 to a location toward the first clutch 50. The four drive gears 14 to 17 (first transmission gears) are rotatably fitted on the first rotating shaft 13 in a state concentric to the first rotating shaft 13. A first clutch actuator 71 (see FIG. 2) is connected to the first clutch 50. The first clutch actuator 71 is electrically connected to the ECU 2. The ECU 2 controls the first clutch actuator 71 to thereby engage and disengage the first clutch 50. When the first clutch 50 is engaged, the first rotating shaft 13 is connected to the first input shaft 11, and is rotated in unison therewith.

Further, the second speed drive gear 14 is in constant mesh with the above-mentioned first-second speed driven gear 33, and a second-speed forward position is formed by the gears 14 and 33 (first transmission gear train). Furthermore, the fourth speed drive gear 15 is in constant mesh with the above-mentioned third-fourth speed driven gear 34, and a fourth-speed forward position is formed by the gears 15 and 34 (first transmission gear train). In addition, the sixth speed drive gear 16 is in constant mesh with the above-mentioned fifth-sixth speed driven gear 35, and a sixth-speed forward position is formed by the gears 16 and 35 (first transmission gear train). Further, the eighth speed drive gear 17 is in constant mesh with the above-mentioned seventh-eighth speed driven gear 36, and an eighth-speed forward position is formed by the gears 17 and 36 (first transmission gear train).

On the other hand, the second-fourth speed synchronization mechanism 18 (first synchronization mechanism) is connected to a second-fourth speed actuator 73 (see FIG. 2) via a second-fourth speed shift fork (not shown). The second-fourth speed actuator 73 is electrically connected to the ECU 2. The second-fourth speed synchronization mechanism 18 and the second-fourth speed actuator 73 are configured similarly to the synchronization mechanism and the actuator proposed by the present applicant in the Publication of Japanese Patent No. 4242189, respectively, and hence although detailed description thereof is omitted, the second-fourth speed actuator 73 is controlled by the ECU 2, as described hereafter, whereby the operation of the second-fourth speed synchronization mechanism 18 is controlled.

More specifically, the ECU 2 controls the second-fourth speed actuator 73 to thereby drive the second-fourth speed shift fork between three positions, i.e. a second speed position, a neutral position, and a fourth speed position, in the axial direction of the first input shaft 11. In this case, when the second-fourth speed shift fork is driven to the second speed position, the second speed drive gear 14 is connected to the first rotating shaft 13 by the second-fourth speed synchronization mechanism 18, whereby the second speed drive gear 14 is rotated in unison with the first rotating shaft 13.

Further, when the second-fourth speed shift fork is driven to the fourth speed position, the fourth speed drive gear 15 is connected to the first rotating shaft 13 by the second-fourth speed synchronization mechanism 18, whereby the fourth speed drive gear 15 is rotated in unison with the first rotating shaft 13. Furthermore, when the second-fourth speed shift fork is at the neutral position, the second speed drive gear 14 and the fourth speed drive gear 15 are rotatably held with respect to the first rotating shaft 13 without being connected thereto, by the second-fourth speed synchronization mechanism 18.

A second-fourth speed position sensor 83 is provided in the vicinity of the extreme end of the second-fourth speed shift fork. The second-fourth speed position sensor 83 is of a magnetic sensor type, and detects the position of the second-fourth speed shift fork to deliver a signal indicative of the detected position of the second-fourth speed shift fork to the ECU 2. The ECU 2 determines the position of the second-fourth speed shift fork based on the detection signal from the second-fourth speed position sensor 83, and determines whether or not the second speed drive gear 14 or the fourth speed drive gear 15 has been connected to the first rotating shaft 13 by the second-fourth speed synchronization mechanism 18.

On the other hand, the sixth-eighth speed synchronization mechanism 19 (first synchronization mechanism) is connected to a sixth-eighth speed actuator 74 (see FIG. 2) via a sixth-eighth speed shift fork (not shown). The sixth-eighth speed actuator 74 is electrically connected to the ECU 2. The sixth-eighth speed synchronization mechanism 19 and the sixth-eighth speed actuator 74 are configured similarly to the above-described second-fourth speed synchronization mechanism 18 and second-fourth speed actuator 73, respectively, and as described hereafter, the sixth-eighth speed actuator 74 is controlled by the ECU 2, whereby the operation of the sixth-eighth speed synchronization mechanism 19 is controlled.

More specifically, the ECU 2 controls the sixth-eighth speed actuator 74 to thereby drive the sixth-eighth speed shift fork between three positions, i.e. a sixth speed position, a neutral position, and an eighth speed position in the axial direction of the first input shaft 11. In this case, when the sixth-eighth speed shift fork is driven to the sixth speed position, the sixth speed drive gear 16 is connected to the first rotating shaft 13 by the sixth-eighth speed synchronization mechanism 19, whereby the sixth speed drive gear 16 is rotated in unison with the first rotating shaft 13.

Further, when the sixth-eighth speed shift fork is driven to the eighth speed position, the eighth speed drive gear 17 is connected to the first rotating shaft 13 by the sixth-eighth speed synchronization mechanism 19, whereby the eighth speed drive gear 17 is rotated in unison with the first rotating shaft 13. Furthermore, when the sixth-eighth speed shift fork is at the neutral position, the sixth speed drive gear 16 and the eighth speed drive gear 17 are rotatably held with respect to the first rotating shaft 13 without being connected thereto, by the sixth-eighth speed synchronization mechanism 19.

A sixth-eighth speed position sensor 84 is provided in the vicinity of the extreme end of the sixth-eighth speed shift fork. The sixth-eighth speed position sensor 84 is of the same type as that of the second-fourth speed position sensor 83, and detects the position of the sixth-eighth speed shift fork to deliver a signal indicative of the detected position of the sixth-eighth speed shift fork to the ECU 2. The ECU 2 determines the position of the sixth-eighth speed shift fork based on the detection signal from the sixth-eighth speed position sensor 84, and determines whether or not the sixth speed drive gear 16 or the eighth speed drive gear 17 has been connected to the first rotating shaft 13 by the sixth-eighth speed synchronization mechanism 19.

Further, the above-mentioned second input shaft 21 is rotatably supported by the transmission case 4 via two bearings 6a and 6b. The second clutch 60 is connected to an end of the second input shaft 21 on a side opposite to the torque converter 10. The second input shaft 21 is provided with a second input gear 22 and a second rotating shaft 23. The second input gear 22 is concentrically fixed to a portion of the second input shaft 21, closer to the torque converter 10 than the second rotating shaft 23 is, and is in constant mesh with the first input gear 12 described above.

The second rotating shaft 23 (input-side second rotating shaft), which is hollow, has an inner hole thereof rotatably fitted on the second input shaft 21, and is rotatably supported by the transmission case 4 via the bearing 6b. A second rotational speed sensor 82 (deviation degree parameter-detecting means) is disposed in the vicinity of the second rotating shaft 23. The second rotational speed sensor 82 detects a second rotational speed N2, which is the rotational speed of the second rotating shaft 23, and delivers a signal indicative of the detected second rotational speed N2 to the ECU 2.

On the other hand, a first speed drive gear 24, a first-third speed synchronization mechanism 28, a third speed drive gear 25, a seventh speed drive gear 27, a fifth-seventh speed synchronization mechanism 29, and a fifth speed drive gear 26 are provided on the second rotating shaft 23 at respective locations in the mentioned order from a location toward the torque converter 10 to a location toward the second clutch 60. The four drive gears 24 to 27 (second transmission gears) are rotatably fitted on the second rotating shaft 23 in a state concentric to the second rotating shaft 23. A second clutch actuator 72 (see FIG. 2) is connected to the second clutch 60. The second clutch actuator 72 is electrically connected to the ECU 2. The ECU 2 controls the second clutch actuator 72 to thereby engage and disengage the second clutch 60. When the second clutch 60 is engaged, the second rotating shaft 23 is connected to the second input shaft 21, and is rotated in unison therewith.

Further, the first speed drive gear 24 is in constant mesh with the above-mentioned first-second speed driven gear 33, and a first-speed forward position is formed by the gears 24 and 33 (second transmission gear train). Furthermore, the third speed drive gear 25 is in constant mesh with the above-mentioned third-fourth speed driven gear 34, and a third-speed forward position is formed by the gears 25 and 34 (second transmission gear train). In addition, the fifth speed drive gear 26 is in constant mesh with the above-mentioned fifth-sixth speed driven gear 35, and a fifth-speed forward position is formed by the gears 26 and 35 (second transmission gear train). Further, the seventh speed drive gear 27 is in constant mesh with the above-mentioned seventh-eighth speed driven gear 36, and a seventh-speed forward position is formed by the gears 27 and 36 (second transmission gear train).

Further, the first-third speed synchronization mechanism 28 (second synchronization mechanism) is connected to a first-third speed actuator 75 (see FIG. 2) via a first-third speed shift fork (not shown). The first-third speed actuator 75 is electrically connected to the ECU 2. The first-third speed synchronization mechanism 28 and the first-third speed actuator 75 are configured similarly to the above-mentioned synchronization mechanisms 18 and 19 and the above-mentioned actuators 73 and 74, respectively. As described hereafter, the first-third speed actuator 75 is controlled by the ECU 2, whereby the operation of the first-third speed synchronization mechanism 28 is controlled.

More specifically, the ECU 2 controls the first-third speed actuator 75 to thereby drive the first-third speed shift fork between three positions, i.e. a first speed position, a neutral position, and a third speed position in the axial direction of the second input shaft 21. In this case, when the first-third speed shift fork is driven to the first speed position, the first speed drive gear 24 is connected to the second rotating shaft 23 by the first-third speed synchronization mechanism 28, whereby the first speed drive gear 24 is rotated in unison with the second rotating shaft 23.

Further, when the first-third speed shift fork is driven to the third speed position, the third speed drive gear 25 is connected to the second rotating shaft 23 by the first-third speed synchronization mechanism 28, whereby the third speed drive gear 25 is rotated in unison with the second rotating shaft 23. Furthermore, when the first-third speed shift fork is located at the neutral position, the first speed drive gear 24 and the third speed drive gear 25 are rotatably held with respect to the second rotating shaft 23 without being connected to the second rotating shaft 23, by the first-third speed synchronization mechanism 28.

Further, a first-third speed position sensor 85 is provided in the vicinity of the extreme end of the first-third speed shift fork. The first-third speed position sensor 85 is of the same type as that of the above-mentioned two position sensors 83 and 84, and detects the position of the first-third speed shift fork to deliver a signal indicative of the detected position of the first-third speed shift fork to the ECU 2. The ECU 2 determines the position of the first-third speed shift fork based on the detection signal from the first-third speed position sensor 85, and determines whether or not the first speed drive gear 24 or the third speed drive gear 25 has been connected to the second rotating shaft 23 by the first-third speed synchronization mechanism 28.

Furthermore, the fifth-seventh speed synchronization mechanism 29 (second synchronization mechanism) is connected to a fifth-seventh speed actuator 76 (see FIG. 2) via a fifth-seventh speed shift fork (not shown). The fifth-seventh speed actuator 76 is electrically connected to the ECU 2. The fifth-seventh speed synchronization mechanism 29 and the fifth-seventh speed actuator 76 are configured similarly to the above-mentioned synchronization mechanisms 18, 19, and 28 and actuators 73 to 75, respectively, and as described hereafter, the fifth-seventh speed actuator 76 is controlled by the ECU 2, whereby the operation of the fifth-seventh speed synchronization mechanism 29 is controlled.

More specifically, the ECU 2 controls the fifth-seventh speed actuator 76 to thereby drive the fifth-seventh speed shift fork between three positions, i.e. a fifth speed position, a neutral position, and a seventh speed position in the axial direction of the second input shaft 21. In this case, when the fifth-seventh speed shift fork is driven to the fifth speed position, the fifth speed drive gear 26 is connected to the second rotating shaft 23 by the fifth-seventh speed synchronization mechanism 29, whereby the fifth speed drive gear 26 is rotated in unison with the second rotating shaft 23.

Further, when the fifth-seventh speed shift fork is driven to the seventh speed position, the seventh speed drive gear 27 is connected to the second rotating shaft 23 by the fifth-seventh speed synchronization mechanism 29, whereby the seventh speed drive gear 27 is rotated in unison with the second rotating shaft 23. Furthermore, when the fifth-seventh speed shift fork is at the neutral position, the fifth speed drive gear 26 and the seventh speed drive gear 27 are rotatably held with respect to the second rotating shaft 23 without being connected thereto, by the fifth-seventh speed synchronization mechanism 29.

Further, a fifth-seventh speed position sensor 86 is provided in the vicinity of the extreme end of the fifth-seventh speed shift fork. The fifth-seventh speed position sensor 86 is of the same type as that of the above-mentioned three position sensors 83 to 85, and detects the position of the fifth-seventh speed shift fork to deliver a signal indicative of the detected position of the fifth-seventh speed shift fork to the ECU 2. The ECU 2 determines the position of the fifth-seventh speed shift fork based on the detection signal from the fifth-seventh speed position sensor 86, and determines whether or not the fifth speed drive gear 26 or the seventh speed drive gear 27 has been connected to the second rotating shaft 23 by the fifth-seventh speed synchronization mechanism 29.

Note that in the following description, a state in which one of the four drive gears 14 to 17 for one of four even-numbered speed positions is connected to the first rotating shaft 13 by one of the two synchronization mechanisms 18 and 19 is referred to as the "in-gear of an even-numbered speed position", and a state in which one of the four drive gears 24 to 27 for one of four odd-numbered speed positions is connected to the second rotating shaft 23 by one of the two synchronization mechanisms 28 and 29 is referred to as the "in-gear of an odd-numbered speed position".

In the automatic transmission 1 arranged as described above, when one of the four even-numbered speed positions (second, fourth, sixth, and eighth speed positions) is put "in gear" by one of the two synchronization mechanisms 18 and 19 in the engaged state of the first clutch 50, motive power input from the engine 3 to the automatic transmission 1 is transmitted to the drive wheels DW via a first power transmission path. More specifically, the motive power from the engine 3 is transmitted to the one of the four even-numbered speed positions in the in-gear state via the first input shaft 11, the first clutch 50, the first rotating shaft 13, and one of the synchronization mechanisms 18 and 19, and is transmitted, after being changed in speed by the even-numbered speed position, to the drive wheels DW via the output shaft 31, the output gear 32, and the final reduction gear box FG.

On the other hand, when one of the four odd-numbered speed positions (first, third, fifth, and seventh speed positions) is put "in gear" by one of the two synchronization mechanisms 28 and 29 in the engaged state of the second clutch 60, motive power input from the engine 3 to the automatic transmission 1 is transmitted to the drive wheels DW via a second power transmission path. More specifically, the motive power of the engine 3 is transmitted to the one of the four odd-numbered speed positions in the in-gear state via the first input shaft 11, the two gears 12 and 22, the second input shaft 21, the second clutch 60, the second rotating shaft 23, and one of the synchronization mechanisms 28 and 29, and is transmitted, after being changed in speed by the odd-numbered speed position, to the drive wheels DW via the output shaft 31, the output gear 32, and the final reduction gear box FG.

Further, the reverse shaft 41 is rotatably supported by the transmission case 4 via two bearings 8a and 8b. The reverse driven gear 42, a reverse gear 43, and a reverse clutch 44 are provided on the reverse shaft 41 at respective locations in the mentioned order from a location toward the torque converter 10 to a location toward the first clutch 50. The reverse driven gear 42 is concentrically fixed to the reverse shaft 41, and is in constant mesh with the first input gear 12. Further, the reverse gear 43 is rotatably provided on the reverse shaft 41, and is in constant mesh with the above-mentioned first-second speed driven gear 33.

Furthermore, an R clutch actuator 77 (see FIG. 2) is connected to the reverse clutch 44. The R clutch actuator 77 is electrically connected to the ECU 2. The ECU 2 controls the R clutch actuator 77 to thereby engage and disengage the reverse clutch 44. When the reverse clutch 44 is engaged as described above, the reverse gear 43 is connected to the reverse shaft 41, and is rotated in unison therewith. This makes it possible for the vehicle V to travel backward.

On the other hand, the vehicle V is provided with a shift lever device and a paddle shift device (neither of which is shown). The shift lever device is of a floor shift lever type, and is provided with five positions, i.e. a parking position, a reverse position, a neutral position, a drive position, and a sport position, as shift positions, whereby the shift lever device is configured such that the shift position thereof can be switched and selected between the five positions according to a shift operation by a driver.

In the automatic transmission 1 arranged as described above, in a transmission control process, described hereinafter, when the shift lever device is in the sport position, the speed position control is executed such that the engine 3 can be used on a higher engine speed side than when the shift lever device is in the drive position. Further, the shift lever device is provided with a shift position sensor 87. The shift position sensor 87 detects which of the five shift positions the shift lever device is in, and delivers a signal indicative of the detected shift position to the ECU 2.

Further, the paddle shift device is used for the driver to intentionally execute a downshift operation or an upshift operation, and is disposed in the vicinity of a steering wheel (not shown). The paddle shift device is provided with a paddle shift sensor 88, and detects the downshift operation or the upshift operation by the driver, to deliver a signal indicative of the detected downshift or upshift operation to the ECU 2.

On the other hand, as illustrated in FIG. 2, a crank angle sensor 89 and an accelerator pedal opening sensor 90 are connected to the ECU 2. The crank angle sensor 89 delivers a CRK signal, which is a pulse signal, to the ECU 2 along with rotation of the crankshaft 3a. Each pulse of the CRK signal is generated whenever the crankshaft 3a rotates through a predetermined crank angle (e.g. 1°). The ECU 2 calculates a rotational speed NE of the engine 3 (hereafter referred to as the "engine speed NE") based on the CRK signal.

Further, the accelerator pedal opening sensor 90 detects a stepped-on amount AP of an accelerator pedal, not shown, (hereinafter referred to as the "accelerator pedal opening AP"), and delivers a signal indicative of the detected accelerator pedal opening AP to the ECU 2.

The ECU 2 is implemented by a microcomputer comprising a CPU, a RAM, a ROM, and an I/O interface (none of which are specifically shown), and executes various control processes, such as an engine control process and the transmission control process, based on the detection signals from the aforementioned sensors 80 to 90, as described hereinafter. Although details of the engine control process are not illustrated here, in the engine control process, the ECU 2 calculates a demanded torque TRQ by searching a map (not shown) according to the accelerator pedal opening AP and the engine speed NE, and controls the amount of fuel to be supplied to the engine 3 and the amount of intake air drawn into the engine 3 such that the engine 3 generates the demanded torque TRQ.

Note that in the present embodiment, the ECU 2 corresponds to control means, execution condition-determining means, motive power fluctuation-causing condition-determining means, pre-shift control execution means, convergence time period-calculating means, execution time period-determining means, motive power difference-calculating means, the vehicle speed-detecting means, the deviation degree parameter-detecting means, first permission means, and second permission means.

Hereafter, the transmission control process will be described with reference to FIG. 3. The transmission control process controls the operations of the above-mentioned four clutches (the reverse clutch 44, the first clutch 50, the second clutch 60, and the lockup clutch), and the four synchronization mechanisms via the eight actuators 70 to 77, described above, and is executed by the ECU 2 at a predetermined control period ΔT (e.g. 10 msec). Note that in the following description, various values calculated are assumed to be stored in the RAM in the ECU 2.

Figure 3:
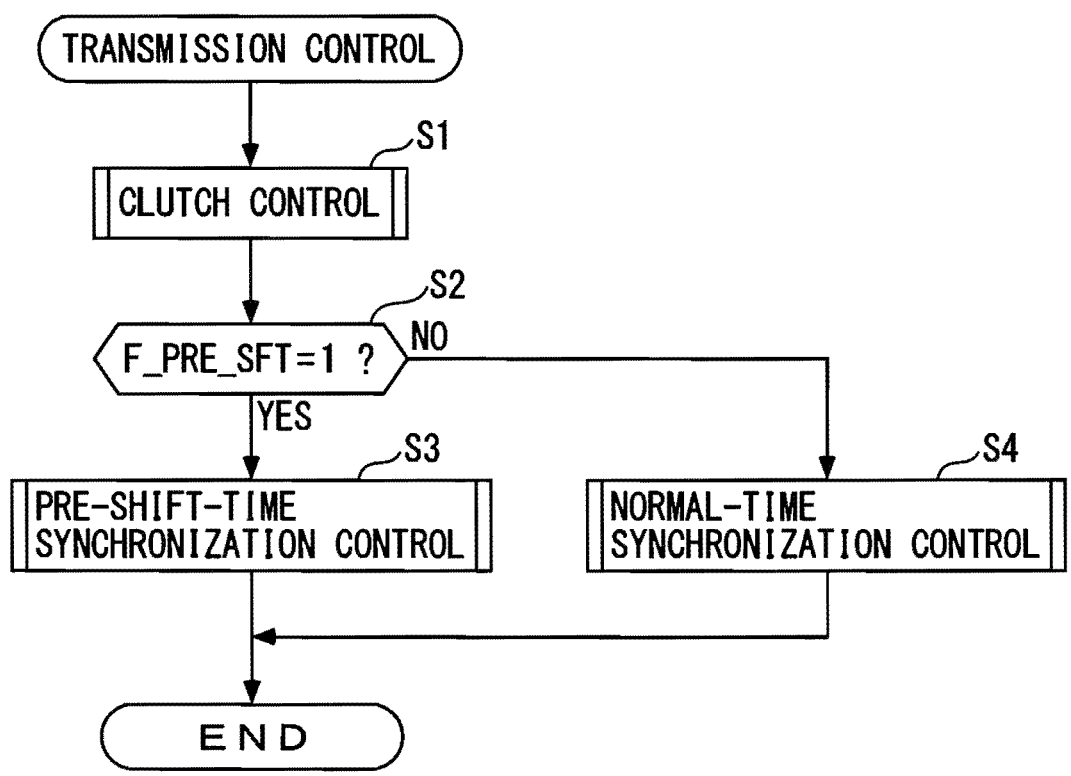
FIG. 3 is a flowchart of a transmission control process.

As shown in FIG. 3, first, in a step 1 (shown as S1 in abbreviated form in FIG. 3; the following steps are also shown in abbreviated form), a clutch control process is executed. In the clutch control process, the engaged/disengaged state of the lockup clutch, the first clutch 50, the second clutch 60, and the reverse clutch 44 are controlled based on the detection signals from the aforementioned sensors 80 to 90.

More specifically, the values of drive signals to be delivered to the four clutch actuators 70 to 72, and 77 are calculated based on the engine speed NE, the vehicle speed VP, the output rotational speed NC, the first rotational speed N1, the second rotational speed N2, the shift positions, the operated state of the paddle shift device, the accelerator pedal opening AP, and the operating states of the four synchronization mechanisms 18, 19, 28, and 29, and then the drive signals are delivered to associated ones of the clutch actuators, whereby the engaged/disengaged states of the lockup clutch, the first clutch 50, the second clutch 60, and the reverse clutch 44 are controlled.

Further, in the clutch control process, when a speed position to be put in gear beforehand has been put in gear by execution of a pre-shift control process, described hereinafter, one of the clutches 50 and 60, which has been engaged until the time, is disengaged and the other of the clutches 50 and 60, which has been disengaged until the time, is engaged, in timing after the speed position has been put in gear. As a consequence, the power transmission path is switched from one to the other of the first power transmission path and the second power transmission path.

In a step 2 following the step 1, it is determined whether or not a pre-shift execution condition flag F_PRE_SFT is equal to 1. The pre-shift execution condition flag F_PRE_SFT indicates whether or not execution conditions for executing the pre-shift control process are satisfied. In a determination process (not shown), if the execution conditions for executing the pre-shift control process are satisfied, the pre-shift execution condition flag F_PRE_SFT is set to 1, and otherwise set to 0.

If the answer to the question of the step 2 is negative (NO), the process proceeds to a step 4, wherein a normal-time synchronization control process is executed. In the normal-time synchronization control process, the values of drive signals to be delivered to the four synchronization mechanisms 18, 19, 28, and 29 are calculated based on the engine speed NE, the vehicle speed VP, the output rotational speed NC, the first rotational speed N1, the second rotational speed N2, the shift positions, the operating condition of the paddle shift device, the accelerator pedal opening AP, the operating conditions of the four clutches (the reverse clutch 44, the first clutch 50, the second clutch 60, and the lockup clutch), and then the drive signals are delivered to associated ones of the clutch actuators 73 to 76, whereby the connected/disconnected states of the four synchronization mechanisms 18, 19, 28, and 29 are controlled.

After the normal-time synchronization control process is executed in the step 4, as described above, the present process is terminated.

On the other hand, if the answer to the question of the step 2 is affirmative (YES), i.e. if the execution conditions for executing the pre-shift control process are satisfied, the process proceeds to a step 3, wherein a pre-shift-time synchronization control process is executed, as described hereinafter, followed by terminating the present process.

In the pre-shift-time synchronization control process, there are executed the pre-shift control process in which in a case where motive power is being transmitted by in-gear of one of the even-numbered speed positions, one of the odd-numbered speed positions is put in gear beforehand while holding the second clutch 60 in the disengaged state, and in a case where motive power is being transmitted by in-gear of one of the odd-numbered speed positions, one of the even-numbered speed positions is put in gear beforehand while holding the first clutch 50 in the disengaged state, as well as a delay control process for delaying execution of the pre-shift control process. Specifically, the pre-shift-time synchronization control process is executed as shown in FIG. 4.

Note that in the following description, in the pre-shift control process, a speed position (one of the first to eighth speed positions) to be put in gear beforehand is referred to as the "target speed position"; a rotating shaft (one of the two rotating shafts 13 and 23) to which a drive gear in the target speed position is to be connected is referred to as the "target rotating shaft"; and a synchronization mechanism (one of the synchronization mechanisms 18, 19, 28 and 29) which operates to cause the drive gear in the target speed position to be connected to the target rotating shaft is referred to as the "target synchronization mechanism".

Figure 4:
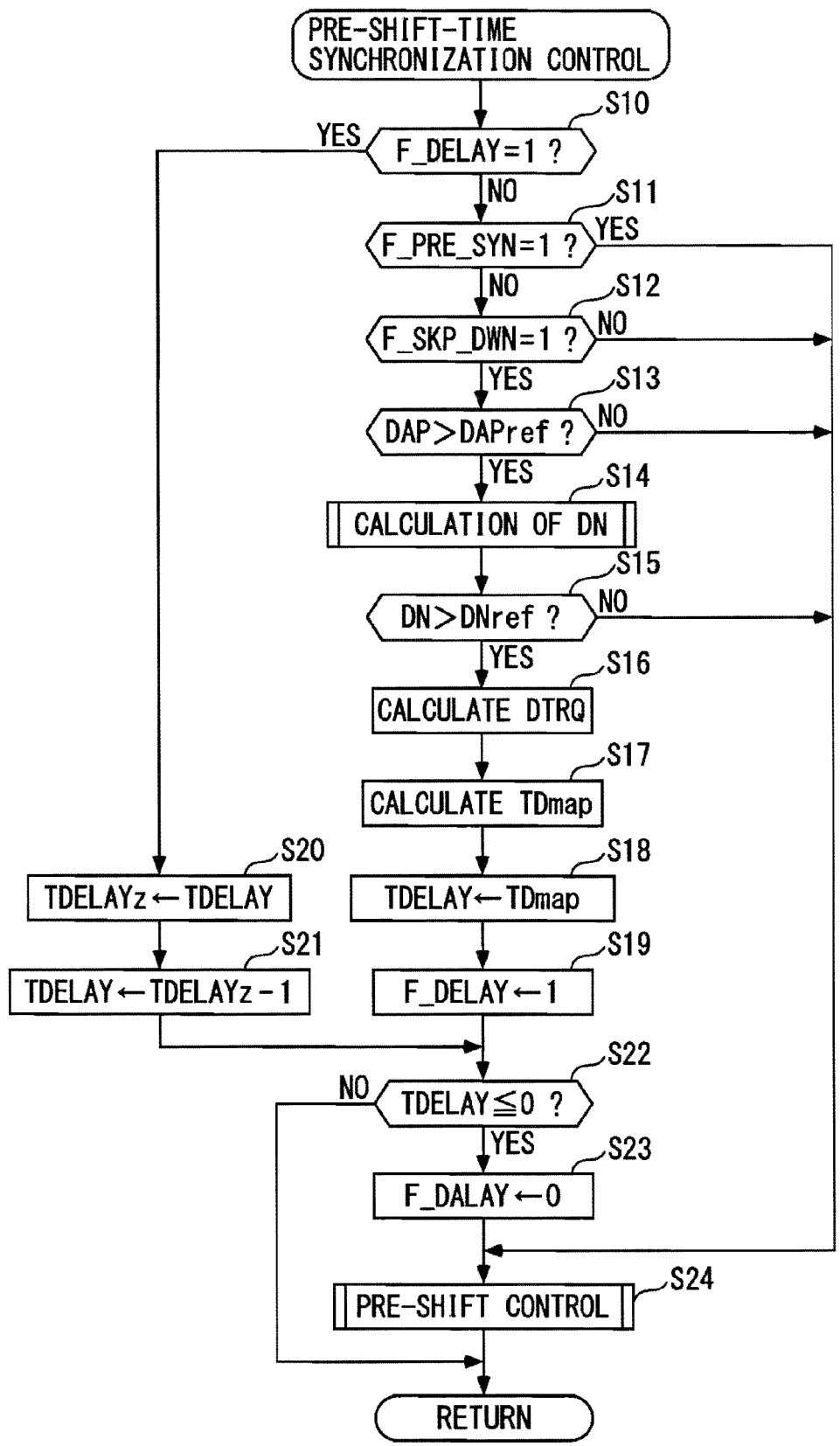
FIG. 4 is a flowchart of a pre-shift-time synchronization control process.

As shown in FIG. 4, first, in a step 10, it is determined whether or not a delay control in-progress flag F_DELAY is equal to 1. If the answer to this question is negative (NO), i.e. if the delay control process, described hereinafter, is not being executed, the process proceeds to a step 11, wherein it is determined whether or not a pre-shift control in-progress flag F_PRE_SYN is equal to 1. This pre-shift control in-progress flag F_PRE_SYN indicates whether or not the pre-shift control process, described hereinafter, is being executed.

If the answer to the question of the step 11 is affirmative (YES), i.e. if the pre-shift control process is being executed, the process proceeds to a step 24, wherein the pre-shift control process is executed, as described hereinafter. On the other hand, if the answer to the question of the step 11 is negative (NO), i.e. if the pre-shift control process is not being executed, the process proceeds to a step 12, wherein it is determined whether or not a skip downshift speed change flag F_SKP_DWN is equal to 1.

The skip downshift speed change flag F_SKP_DWN indicates whether or not execution conditions for executing skip downshift control are satisfied. The skip downshift control is for down-shifting the speed position by n speed positions (n is an odd number equal to or larger than 3), e.g. from the fifth speed position to the second speed position, due to a sudden increase in the accelerator pedal opening AP or a downshift operation of the paddle shift device by the driver. In a determination process (not shown), if the execution conditions for executing the skip downshift control are satisfied, the skip downshift speed change flag F_SKP_DWN is set to 1, and otherwise set to 0.

If the answer to the question of the step 12 is negative (NO), i.e. if the execution conditions for executing the skip downshift control are not satisfied, it is determined that the target speed position may be immediately put in gear, and the process proceeds to the above-mentioned step 24.

On the other hand, if the answer to the question of the step 12 is affirmative (YES), i.e. if the execution conditions for executing the skip downshift control are satisfied, the process proceeds to a step 13, wherein it is determined whether or not an accelerator pedal opening difference DAP is larger than a predetermined value DAPref. The accelerator pedal opening difference DAP represents the difference between the current value of the accelerator pedal opening AP and the immediately preceding value thereof.

If the answer to the question of the step 13 is negative (NO), i.e. if the amount of an increase in the accelerator pedal opening AP between the immediately preceding control timing and the current control timing is not large, it is determined that the target speed position may be immediately put in gear, and the process proceeds to the above-mentioned step 24.

On the other hand, if the answer to the question of the step 13 is affirmative (YES), i.e. if the amount of an increase in the accelerator pedal opening AP between the immediately preceding control timing and the current control timing is large, the process proceeds to a step 14, wherein a rotational difference DN is calculated.

Figure 5:
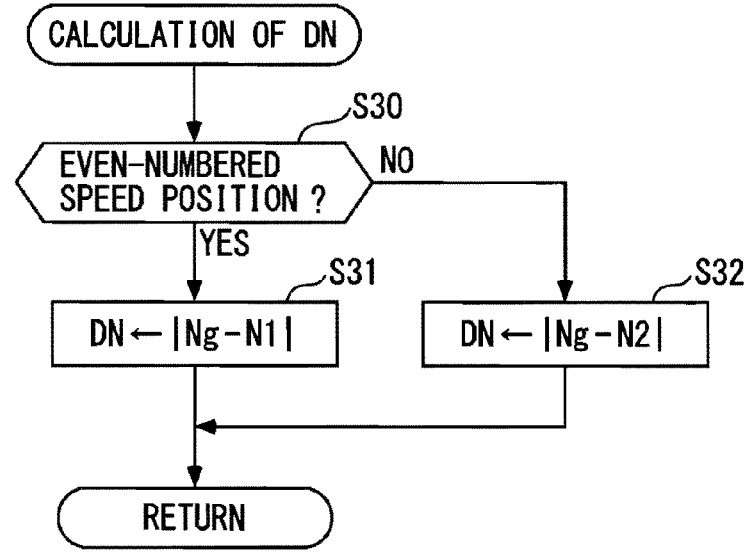
FIG. 5 is a flowchart of a process for calculating a rotational difference.

The calculation of the rotational difference DN is specifically executed, as shown in FIG. 5. Referring to FIG. 5, first, in a step 30, it is determined whether or not the target speed position is an even-numbered speed position.

If the answer to this question is affirmative (YES), i.e. if the target speed position is an even-numbered speed position, the process proceeds to a step 31, wherein the rotational difference DN is set to the absolute value |Ng−N1| of the difference between the target gear speed Ng and the first rotational speed N1, followed by terminating the present process. The target gear speed Ng is calculated based on the gear ratio of the target speed position and the output rotational speed NC.

On the other hand, if the answer to the question of the step 30 is negative (NO), i.e. if the target speed position is an odd-numbered speed position, the process proceeds to a step 32, wherein the rotational difference DN is set to the absolute value |Ng−N2| of the difference between the target gear speed Ng and the second rotational speed N2, followed by terminating the present process.

Referring again to FIG. 4, after the rotational difference DN is calculated in the step 14, as described above, the process proceeds to a step 15, wherein it is determined whether or not the rotational difference DN is larger than a predetermined value DNref. In the present embodiment, the rotational difference DN corresponds to a deviation degree parameter, and a condition that the rotational difference DN is larger than the predetermined value DNref corresponds to a condition that the deviation degree is larger than a predetermined degree.

If the answer to the question of the step 15 is negative (NO), i.e. if the rotational difference between the drive gear of the target speed position and the target rotating shaft to which the drive gear of the target speed position is to be connected is small, it is determined that the target speed position may be immediately put in gear, and the process proceeds to the above-mentioned step 24.

On the other hand, if the answer to the question of the step 15 is affirmative (YES), i.e. if the rotational difference between the drive gear of the target speed position and the target rotating shaft to which the drive gear of the target speed position is to be connected is large, it is determined that the delay control process for delaying execution of the pre-shift operation should be executed, and the process proceeds to a step 16, wherein a torque difference DTRQ is calculated. The torque difference DTRQ is calculated as the difference between the current value of the demanded torque TRQ (value calculated in the current control timing) and the immediately preceding value thereof (value calculated in the immediately preceding control timing). Note that in the present embodiment, the torque difference corresponds to a motive power difference; the current value of the demanded torque TRQ corresponds to a first motive power; and the immediately preceding value of the demanded torque TRQ corresponds to a second motive power.

Then, the process proceeds to a step 17, wherein a map value TDmap is calculated by searching a map (not shown) according to the torque difference DTRQ and the vehicle speed VP. When torque fluctuation of the engine 3 occurs to cause rotation fluctuation of the output shaft 31, the map value TDmap is used for calculating a convergence time period estimated to be taken before the rotation fluctuation is converged. In the present embodiment, the convergence time period is specifically calculated as a value ΔT·TDmap, and this value ΔT·TDmap is set to an execution time period over which the delay control process is to be executed, by a method described hereinafter.

Note that the map value TDmap may be calculated by a method of calculating a basic map value according to the torque difference DTRQ and correcting the basic map value using a value calculated by searching a map according to the vehicle speed VP.

Next, the process proceeds to a step 18, wherein a delay control timer count value TDELAY is set to the map value TDmap. In a step 19 following the step 18, to indicate that the delay control process is being executed, the delay control in-progress flag F_DELAY is set to 1.

After the delay control in-progress flag F_DELAY is set to 1 in the step 19, as described above, the answer to the question of the above-mentioned step 10 becomes affirmative (YES). In this case, the process proceeds to a step 20, wherein the immediately preceding value TDELAYz of the delay control timer count value is set to the delay control timer count value TDELAY.

Then, the process proceeds to a step 21, wherein the delay control timer count value TDELAY is set to a value obtained by subtracting 1 from the immediately preceding value TDELAYz thereof (TDELAYz−1). That is, the delay control timer count value TDELAY is decremented by 1.

In a step 22 following the step 19 or 21, it is determined whether or not the delay control timer count value TDELAY has become equal to or smaller than 0. If the answer to this question is negative (NO), the present process is immediately terminated.

On the other hand, if the answer to the question of the step 22 is affirmative (YES), i.e. if a time period corresponding to the value ΔT·TDmap has elapsed, it is determined that the delay control process should be terminated, and the process proceeds to a step 23, wherein to indicate the fact, the delay control in-progress flag F_DELAY is set to 0.

In the step 24 following one of the above-mentioned steps 11 to 13, 15, and 23, the pre-shift control process is executed. The pre-shift control process is specifically executed, as shown in FIG. 6.

Figure 6:
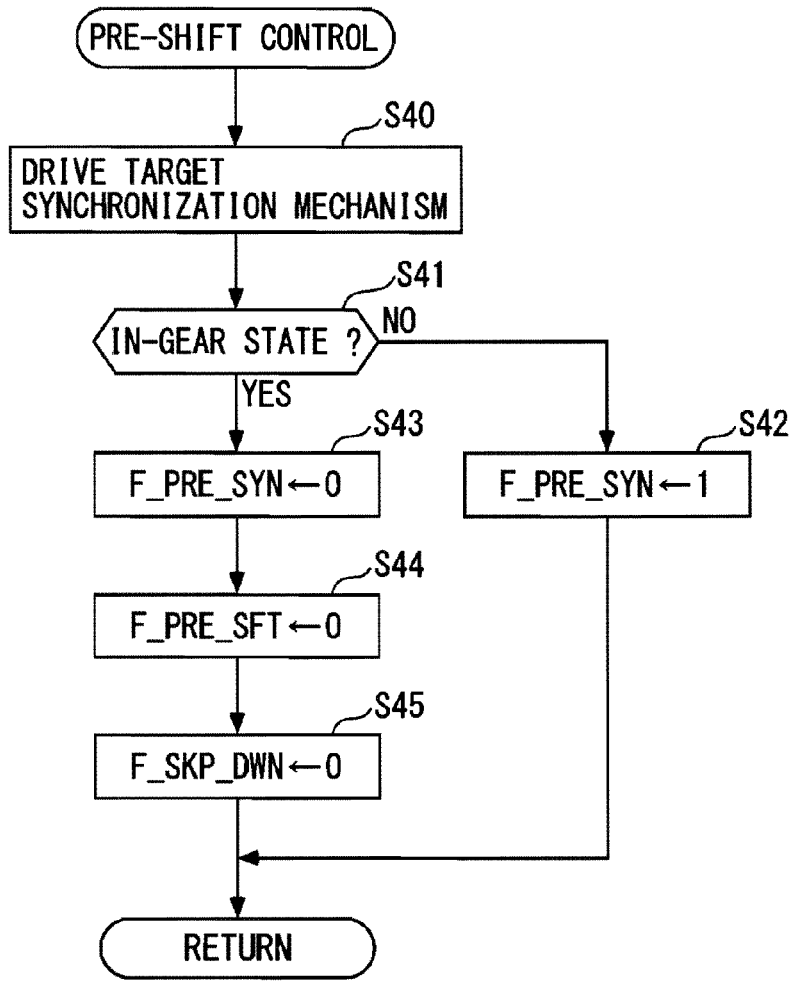
FIG. 6 is a flowchart of a pre-shift control process.

Referring to FIG. 6, first, in a step 40, the target synchronization mechanism is driven by an associated one of the actuators such that the target speed position is put in gear.

Then, the process proceeds to a step 41, wherein it is determined whether or not the target speed position has been put in gear, based on a detection signal from one of the above-mentioned four position sensors 83 to 86, associated with the target speed position. If the answer to this question is negative (NO), it is determined that the pre-shift control process should continue to be executed, and the process proceeds to a step 42, wherein to indicate the fact, the pre-shift control in-progress flag F_PRE_SYN is set to 1, followed by terminating the present process.

On the other hand, if the answer to the question of the step 41 is affirmative (YES), i.e. if the target speed position has been put in gear, it is determined that the pre-shift control process should be terminated, and the process proceeds to a step 43, wherein to indicate the fact, the pre-shift control in-progress flag F_PRE_SYN is set to 0.

Then, the process proceeds to a step 44, wherein to indicate that the pre-shift control process should be terminated, the pre-shift execution condition flag F_PRE_SFT is set to 0, and then the process proceeds to a step 45, wherein the skip downshift speed change flag F_SKP_DWN is set to 0, followed by terminating the present process.

Referring again to FIG. 4, after the pre-shift control process is executed in the step 24, as described above, the pre-shift-time synchronization control process is terminated.

Figure 7:
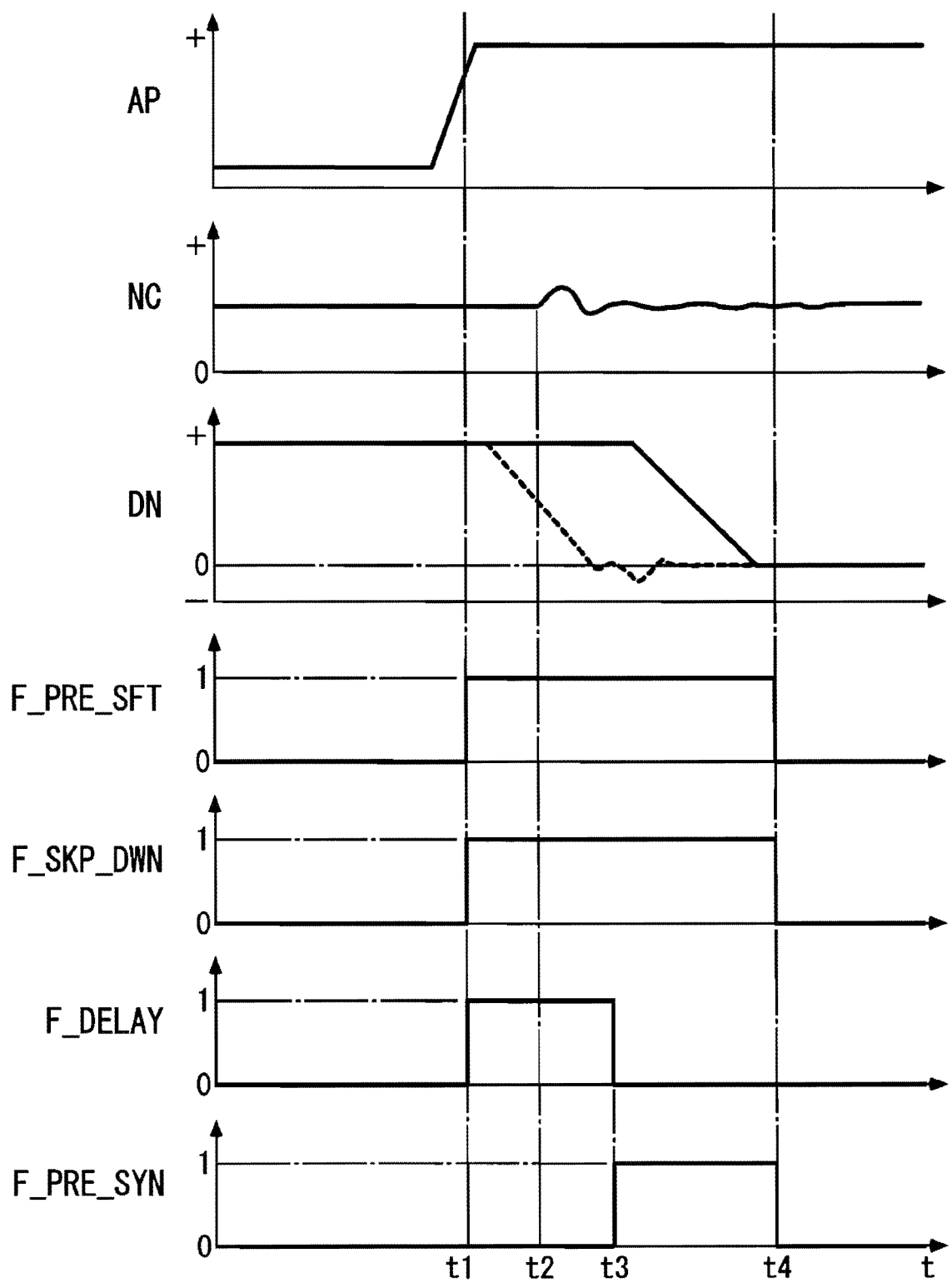
FIG. 7 is a timing diagram showing an example of control results in a case where the pre-shift-time synchronization control process is executed.

Next, an example of control results of the pre-shift-time synchronization control process according to the present embodiment executed as described hereinabove will be described with reference to FIG. 7. Referring to FIG. 7, curves representing the rotational difference DN, indicated by solid lines, show examples of control results of the present embodiment (hereinafter referred to as the "present control example", and a curve representing the rotational difference DN, indicated by a broken line, shows, for reference purposes, a comparative example of the control results in a case where the pre-shift control process is immediately executed without executing the delay control process.

As shown in FIG. 7, at a time t1, the accelerator pedal is stepped on by the driver, causing a sudden increase in the accelerator pedal opening AP, whereby DAP>DAPref holds, so that from a time t2 on, the sudden increase in the accelerator pedal opening AP causes a sudden increase in engine torque, which causes fluctuation in the output rotational speed NC.

In this case, it is understood that in the comparative example, the pre-shift control process is started at the time t1, whereby even after the target speed position has been put in gear, the fluctuation in the output rotational speed NC causes a fluctuation state of the rotational difference DN, so that this can cause temporary failure of synchronization by the synchronization mechanism.

In contrast, in the present control example, at the time t1, all the above-mentioned pre-shift execution condition flag F_PRE_SFT, skip downshift speed change flag F_SKP_DWN, and delay control in-progress flag F_DELAY are set to 1, whereby the delay control process is started.

Then, at a time (time t3) when the time period corresponding to the value ΔT·TDmap has elapsed and the fluctuation in the output rotational speed NC has substantially converged, the delay control in-progress flag F_DELAY is changed from 1 to 0, whereby the delay control process is terminated. At the same time, the pre-shift control in-progress flag F_PRE_SYN is changed from 0 to 1, whereby the pre-shift control process is started. After that, the rotational difference DN converges to approximately 0, and at a time when the target speed position has been put in gear (time t4), all the three flags F_PRE_SFT, F_SKP_DWN, and F_PRE_SYN are changed from 1 to 0, whereby the pre-shift control process is terminated.

As described above, it is understood that in the present control example, the pre-shift control process is started at the time when the fluctuation in the output rotational speed NC has substantially converged, so that it is possible to execute a synchronizing connection operation by the target synchronization mechanism while avoiding the adverse influence of the fluctuation in the output rotational speed NC.

As described hereinabove, according to the automatic transmission 1 of the present embodiment, when the pre-shift-time synchronization control process is executed, if F_SKP_DWN=1, DAP>DAPref, and DN>DNref all hold, the delay control process is executed. The delay control process is terminated at the time when the time period corresponding to the value ΔT·TDmap has elapsed, and the pre-shift control process is executed, whereby the target synchronization mechanism is driven such that the target speed position is put in gear.

In this case, the execution time period ΔT·TDmap over which the delay control process is to be executed for delaying the start of the pre-shift control is set, as described above, to the convergence time period which is estimated to be taken before convergence of the state of rotation fluctuation of the output shaft 31. Therefore, when it is estimated that fluctuation in the engine torque will occur to cause rotation fluctuation of the output shaft 31, it is possible to start the pre-shift control at a time when the rotation fluctuation of the output shaft 31 has converged. This makes it possible to avoid occurrence of synchronization failure, thereby making it possible to improve the stability and reliability of the connection operation of the synchronization mechanism during the pre-shift control. Further, it is possible to prevent gear teeth hitting and gear noise from being caused by synchronization failure, whereby it is possible to prolong the service life of the synchronization mechanism, thereby making it possible to enhance marketability.

On the other hand, if any of the answers to the questions of the steps 12, 13, and 15 is negative (NO), i.e. if it is estimated that the state of rotation fluctuation of the output shaft 31 will not be caused or the automatic transmission 1 is unsusceptible to a caused rotation fluctuation of the output shaft 31, the pre-shift-time synchronization control process is immediately started, so that it is possible to shorten a time period required for the shift operation of the automatic transmission 1, thereby making it possible to enhance the marketability.

Further, the map value TDmap for determining the execution time period ΔT·TDmap over which the delay control process is to be executed is calculated based on the torque difference which is the difference between the current value of the demanded torque TRQ and the immediately preceding value thereof and the vehicle speed VP. In this case, the torque difference is the difference between torques estimated to be generated by the engine 3 at respective successive control timings immediately before and immediately after the condition of the pre-shift execution condition flag F_PRE_SFT=1 is satisfied, and hence is calculated as a value accurately indicating a degree of occurrence of torque fluctuation of the engine 3.

Further, in general, it is known that under the condition of low vehicle speed, the power transmission paths of the vehicle V are susceptible to torque fluctuation of the engine 3 and rotation fluctuation of the output shaft 31 is liable to occur, whereas under the condition of high vehicle speed, the power transmission paths are unsusceptible to torque fluctuation of the engine 3, whereby the rotation fluctuation of the output shaft 31 is difficult to occur. For this reason, by calculating the value TDmap based on not only the torque difference but also the vehicle speed VP, it is possible to calculate the value TDmap while properly reflecting thereon a state of occurrence of rotation fluctuation of the output shaft 31 caused by the adverse influence of torque fluctuation of the engine 3. Therefore, by determining the execution time period ΔT·TDmap in the delay control process by using the TDmap calculated as above, it is possible to properly determine a just enough length of the execution time period $\Delta T \cdot TDmap$.

Further, in a case where DAP>DAPref holds, and motive power fluctuation-causing conditions in which the state of rotation fluctuation of the output shaft 31 is estimated to be caused are satisfied, when DN>DNref holds, the delay control process is executed, whereas when DN≤DNref holds, the pre-shift control process is immediately executed without executing the delay control process. As described above, in the case where F_SKP_DWN=1 and DAP>DAPref hold, and the state of rotation fluctuation of the output shaft 31 is estimated to be caused, when the difference between the target gear speed Ng and the rotational speed of the target rotating shaft (the first rotational speed N1 or the second rotational speed N2) is large, if the synchronizing connection operation for connecting the drive gear for the target speed position to the target rotating shaft is executed by the target synchronization mechanism, synchronization failure of the synchronization mechanism is liable to occur, whereas when the difference between Ng and the rotational speed of the target rotating shaft is small, the synchronization failure is not liable to occur. Therefore, when the synchronization failure is liable to occur, the delay control process is executed, whereas when the synchronization failure is not liable to occur, the pre-shift control process is immediately executed without executing the delay control process, whereby it is possible to shorten the time period required for the shift operation of the automatic transmission 1 while avoiding occurrence of synchronization failure, thereby making it possible to enhance the marketability.

Furthermore, in the case where DAP>DAPref holds, and it is estimated that the state of rotation fluctuation of the output shaft 31 will be caused, when F_SKP_DWN=1 holds, i.e. when the synchronization failure is liable to occur since the number of speed positions across which a downshift is to be executed is large, the delay control process is executed, and otherwise, i.e. when the synchronization failure is not liable to occur since the number of speed positions across which a downshift is to be executed is small, or an upshift is demanded, the pre-shift control process is immediately executed without executing the delay control process. This makes it possible to further shorten a time period required for the shift operation while avoiding occurrence of synchronization failure, thereby making it possible to further improve the marketability.

Note that although in the above-described embodiment, the automatic transmission according to the present invention is applied to a four-wheel vehicle, it is to be understood that the automatic transmission according to the present invention is not limited to this, but can be applied to other industrial machines. For example, the automatic transmission according to the present invention may be applied to boats, caterpillar type vehicles, two-wheel vehicles, and vehicles with six or more wheels.

Further, although in the above-described embodiment, the engine is used as a prime mover, by way of example, the prime mover of the present invention is not limited to this, but any suitable prime mover may be used insofar as it can generate motive power. For example, an electric motor or a combination of an electric motor and an internal combustion engine may be used as the prime mover.

Furthermore, although in the above-described embodiment, the drive wheels DW of a vehicle are used as driven parts, by way of example, the driven parts of the present invention are not limited to these, but any suitable driven parts may be used insofar as they are driven by the motive power of the prime mover. For example, a screw propeller may be used as a driven part when the automatic transmission according to the present invention is applied to boats.

On the other hand, although in the above-described embodiment, one of the plurality of first rotating shafts and one of the plurality of second rotating shafts are shared as the output shaft 31, by way of example, this is not limitative, but for example, two or more output shafts may be provided such that one of the output shafts is used as the first rotating shaft, and the other thereof is used as the second rotating shaft.

Further, although in the above-described embodiment, synchronization mechanisms of the same type as that of the synchronization mechanism disclosed in the Publication of Japanese Patent No. 4242189 are used as the first and second synchronization mechanisms, by way of example, the first and second synchronization mechanisms according to the present invention are not limited to these, but any suitable synchronization mechanisms may be used insofar as they connect between one transmission gear and one rotating shaft while synchronizing them with each other, and disconnect them from each other. For example, an electromagnetic clutch type synchronization mechanism may be used as the first synchronization mechanism or the second synchronization mechanism.

Furthermore, although in the above-described embodiment, the rotational difference DN is used as a deviation degree parameter, by way of example, the deviation degree parameter of the present invention is not limited to this, but any suitable deviation degree parameter may be used insofar as it represents a degree of deviation between the rotational speed of one transmission gear and the rotational speed of one rotating shaft when an associated synchronization mechanism is in a disconnected state. For example, a ratio between the rotational speed of one transmission gear and the rotational speed of one rotating shaft or the reciprocal of the ratio may be used as the deviation degree parameter. In this case, in the above-described respective steps 31 and 32, ratios Ng/N1 and Ng/N2 between the target gear speed Ng and the respective rotational speeds of the target rotating shafts (or the reciprocals of the ratios) may be calculated, and in the above-mentioned step 15, a comparison may be made between a corresponding one of the ratios (or the reciprocals thereof) and a predetermined value.

On the other hand, although in the above-described embodiment, the execution time period over which the delay control is to be executed is set to the convergence time period $\Delta T \cdot TDmap$ estimated to be taken before convergence of rotation fluctuation of the output shaft 31, by way of example, the execution time period over which the delay control is to be executed according to the present invention is not limited to this, but any suitable execution time period may be used insofar as it is a value calculated based on the convergence time period. For example, the execution time period over which the delay control is to be executed may be set to a time period longer than the value $\Delta T \cdot TDmap$, or a time period slightly shorter than the value $\Delta T \cdot TDmap$.

Further, although in the above-described embodiment, the transmission gears for the even-numbered speed positions are provided on the first rotating shaft 13, and the transmission gears for the odd-numbered speed positions are provided on the second rotating shaft 23, by way of example, the transmission gears for the even-numbered speed positions may be provided on the second rotating shaft 23, and the transmission gears for the odd-numbered speed positions may be provided on the first rotating shaft 13.

It is further understood by those skilled in the art that the foregoing are preferred embodiments of the invention, and that various changes and modifications may be made without departing from the spirit and scope thereof.

What is claimed is:

1. An automatic transmission including:
   a plurality of first rotating shafts including an input-side first rotating shaft to which motive power is input from a prime mover;
   a plurality of first transmission gear trains that are provided on said plurality of first rotating shafts, for forming a first power transmission path for transmitting the motive power from the prime mover to driven parts, in cooperation with said plurality of first rotating shafts, said plurality of first transmission gear trains setting a plurality of speed positions, respectively;
   a first synchronization mechanism that connects between one transmission gear out of said plurality of first transmission gear trains and one rotating shaft out of said plurality of first rotating shafts with each other while synchronizing the one transmission gear and the one rotating shaft with each other, thereby making it possible to transmit the motive power from the prime mover to the driven parts via the first power transmission path while changing a speed of the motive power, and releases the connection between the one transmission gear and the one rotating shaft;
   a first clutch that connects and disconnects between the prime mover and said input-side first rotating shaft;
   a plurality of second rotating shafts including an input-side second rotating shaft to which the motive power is input from the prime mover;
   a plurality of second transmission gear trains that are provided on said plurality of second rotating shafts, for forming a second power transmission path for transmitting the motive power from the prime mover to the driven parts, which is different from the first power transmission path, in cooperation with said plurality of second rotating shafts, said plurality of second transmission gear trains setting a plurality of speed positions, respectively;
   a second synchronization mechanism that connects between one transmission gear of said plurality of second transmission gear trains and one rotating shaft of said plurality of second rotating shafts with each other while synchronizing the one transmission gear and the one rotating shaft with each other, thereby making it possible to transmit the motive power from the prime mover to the driven parts via the second power transmission path while changing a speed of the motive power, and releases the connection between the one transmission gear and the one rotating shaft;
   a second clutch that connects and disconnects between the prime mover and said input-side second rotating shaft; and
   control means for setting a power transmission path for transmitting the motive power from the prime mover to the driven parts, to one of the first power transmission path and the second power transmission path, by controlling one of said first clutch and said second clutch to an engaged state and the other of said first clutch and said second clutch to a disengaged state, and controlling one of said first synchronization mechanism and said second synchronization mechanism to a connecting state and the other of said first synchronization mechanism and said second synchronization mechanism to a releasing state, said control means performing, to change a speed position, switching control for switching the power transmission path from the one to the other of the first power transmission path and the second power transmission path, by switching between the engaged state and the disengaged state of the one and the other of said first clutch and said second clutch and between the connecting state and the releasing state of the one and the other of said first synchronization mechanism and said second synchronization mechanism, and executing, when performing the switching control, pre-shift control in which while holding the one clutch in the engaged state, the one synchronization mechanism in the connecting state, and the other clutch in the disengaged state, the other synchronization mechanism is caused to shift from the releasing state to the connecting state,
   wherein said control means comprises:
   execution condition-determining means for determining whether or not execution conditions for executing the pre-shift control are satisfied, before executing the switching control;
   motive power fluctuation-causing condition-determining means for determining, based on a result of determination by said execution condition-determining means, when the execution conditions for executing the pre-shift control are satisfied, whether or not there are satisfied motive power fluctuation-causing conditions from which a predetermined motive power fluctuation state of the prime mover is estimated to occur after satisfaction of the executing conditions; and
   pre-shift control execution means for performing, based on a result of determination by said motive power fluctuation-causing condition-determining means, to execute delay control for delaying a start of the pre-shift control when the motive power fluctuation-causing conditions are satisfied, and to start the pre-shift control without executing the delay control when the motive power fluctuation-causing conditions are not satisfied.

2. The automatic transmission according to claim 1, wherein said pre-shift control execution means includes:
   convergence time period-calculating means for calculating a convergence time period to be taken before convergence of rotation fluctuation which is caused in the other of the first power transmission path and the second power transmission path by occurrence of the predetermined motive power fluctuation state, when the motive power fluctuation-causing conditions are satisfied; and
   execution time period-determining means for determining, based on the convergence time period, an execution time period over which the delay control is to be executed.

3. The automatic transmission according to claim 2, wherein said pre-shift control execution means further includes motive power difference-calculating means for calculating a motive power difference which is a difference between a first motive power estimated to be generated by the prime mover immediately after satisfaction of the execution conditions for executing the pre-shift control, and a second motive power generated by the prime mover immediately before satisfaction of the execution conditions for executing the pre-shift control, and
   wherein said convergence time period-calculating means calculates the convergence time period based on the motive power difference.

4. The automatic transmission according to claim 3, wherein the prime mover is installed on a vehicle,
   wherein the driven parts are wheels of the vehicle,
   the automatic transmission further including vehicle speed-detecting means for detecting a vehicle speed, which is a speed of the vehicle, wherein said convergence time period-calculating means calculates the convergence time period based on not only the motive power difference but also the vehicle speed.

5. The automatic transmission according to claim 4, wherein said pre-shift control execution means further includes:
deviation degree parameter-detecting means for detecting a deviation degree parameter indicative of a degree of deviation between a rotational speed of the one transmission gear and a rotational speed of the one rotating shaft when the other synchronization mechanism is in the releasing state; and
first permission means for performing, in a case where the motive power fluctuation-causing conditions are satisfied, to permit execution of the delay control, when the degree of deviation indicated by the deviation degree parameter is larger than a predetermined degree, and to inhibit execution of the delay control and permit execution of the pre-shift control, when the degree of deviation indicated by the deviation degree parameter is not larger than the predetermined degree.

6. The automatic transmission according to claim 5, wherein a plurality of odd-numbered speed positions are set by one of said plurality of first transmission gear trains and said plurality of second transmission gear trains, and a plurality of even-numbered speed positions are set by the other of said plurality of first transmission gear trains and said plurality of second transmission gear trains, respectively, and
wherein said pre-shift control execution means further includes second permission means for performing, in a case where the motive power fluctuation-causing conditions are satisfied, to permit execution of the delay control when a down-shifting speed position change demand for downshifting by n speed positions (n is an odd number equal to or larger than 3) has occurred, but otherwise to inhibit execution of the delay control and permit execution of the pre-shift control.

7. The automatic transmission according to claim 4, wherein a plurality of odd-numbered speed positions are set by one of said plurality of first transmission gear trains and said plurality of second transmission gear trains, and a plurality of even-numbered speed positions are set by the other of said plurality of first transmission gear trains and said plurality of second transmission gear trains, respectively, and
wherein said pre-shift control execution means further includes second permission means for performing, in a case where the motive power fluctuation-causing conditions are satisfied, to permit execution of the delay control when a down-shifting speed position change demand for downshifting by n speed positions (n is an odd number equal to or larger than 3) has occurred, but otherwise to inhibit execution of the delay control and permit execution of the pre-shift control.

8. The automatic transmission according to claim 3, wherein said pre-shift control execution means further includes:
deviation degree parameter-detecting means for detecting a deviation degree parameter indicative of a degree of deviation between a rotational speed of the one transmission gear and a rotational speed of the one rotating shaft when the other synchronization mechanism is in the releasing state; and
first permission means for performing, in a case where the motive power fluctuation-causing conditions are satisfied, to permit execution of the delay control, when the degree of deviation indicated by the deviation degree parameter is larger than a predetermined degree, and to inhibit execution of the delay control and permit execution of the pre-shift control, when the degree of deviation indicated by the deviation degree parameter is not larger than the predetermined degree.

9. The automatic transmission according to claim 8, wherein a plurality of odd-numbered speed positions are set by one of said plurality of first transmission gear trains and said plurality of second transmission gear trains, and a plurality of even-numbered speed positions are set by the other of said plurality of first transmission gear trains and said plurality of second transmission gear trains, respectively, and
wherein said pre-shift control execution means further includes second permission means for performing, in a case where the motive power fluctuation-causing conditions are satisfied, to permit execution of the delay control when a down-shifting speed position change demand for downshifting by n speed positions (n is an odd number equal to or larger than 3) has occurred, but otherwise to inhibit execution of the delay control and permit execution of the pre-shift control.

10. The automatic transmission according to claim 3, wherein a plurality of odd-numbered speed positions are set by one of said plurality of first transmission gear trains and said plurality of second transmission gear trains, and a plurality of even-numbered speed positions are set by the other of said plurality of first transmission gear trains and said plurality of second transmission gear trains, respectively, and
wherein said pre-shift control execution means further includes second permission means for performing, in a case where the motive power fluctuation-causing conditions are satisfied, to permit execution of the delay control when a down-shifting speed position change demand for downshifting by n speed positions (n is an odd number equal to or larger than 3) has occurred, but otherwise to inhibit execution of the delay control and permit execution of the pre-shift control.

11. The automatic transmission according to claim 2, wherein said pre-shift control execution means further includes:
deviation degree parameter-detecting means for detecting a deviation degree parameter indicative of a degree of deviation between a rotational speed of the one transmission gear and a rotational speed of the one rotating shaft when the other synchronization mechanism is in the releasing state; and
first permission means for performing, in a case where the motive power fluctuation-causing conditions are satisfied, to permit execution of the delay control, when the degree of deviation indicated by the deviation degree parameter is larger than a predetermined degree, and to inhibit execution of the delay control and permit execution of the pre-shift control, when the degree of deviation indicated by the deviation degree parameter is not larger than the predetermined degree.

12. The automatic transmission according to claim 11, wherein a plurality of odd-numbered speed positions are set by one of said plurality of first transmission gear trains and said plurality of second transmission gear trains, and a plurality of even-numbered speed positions are set by the other of said plurality of first transmission gear trains and said plurality of second transmission gear trains, respectively, and
wherein said pre-shift control execution means further includes second permission means for performing, in a case where the motive power fluctuation-causing conditions are satisfied, to permit execution of the delay control when a down-shifting speed position change demand for downshifting by n speed positions (n is an odd number equal to or larger than 3) has occurred, but otherwise to inhibit execution of the delay control and permit execution of the pre-shift control.

13. The automatic transmission according to claim 2, wherein a plurality of odd-numbered speed positions are set by one of said plurality of first transmission gear trains and said plurality of second transmission gear trains, and a plurality of even-numbered speed positions are set by the other of said plurality of first transmission gear trains and said plurality of second transmission gear trains, respectively, and wherein said pre-shift control execution means further includes second permission means for performing, in a case where the motive power fluctuation-causing conditions are satisfied, to permit execution of the delay control when a down-shifting speed position change demand for downshifting by n speed positions (n is an odd number equal to or larger than 3) has occurred, but otherwise to inhibit execution of the delay control and permit execution of the pre-shift control.

14. The automatic transmission according to claim 1, wherein said pre-shift control execution means further includes:

deviation degree parameter-detecting means for detecting a deviation degree parameter indicative of a degree of deviation between a rotational speed of the one transmission gear and a rotational speed of the one rotating shaft when the other synchronization mechanism is in the releasing state; and first permission means for performing, in a case where the motive power fluctuation-causing conditions are satisfied, to permit execution of the delay control, when the degree of deviation indicated by the deviation degree parameter is larger than a predetermined degree, and to inhibit execution of the delay control and permit execution of the pre-shift control, when the degree of deviation indicated by the deviation degree parameter is not larger than the predetermined degree.

15. The automatic transmission according to claim 14, wherein a plurality of odd-numbered speed positions are set by one of said plurality of first transmission gear trains and said plurality of second transmission gear trains, and a plurality of even-numbered speed positions are set by the other of said plurality of first transmission gear trains and said plurality of second transmission gear trains, respectively, and wherein said pre-shift control execution means further includes second permission means for performing, in a case where the motive power fluctuation-causing conditions are satisfied, to permit execution of the delay control when a down-shifting speed position change demand for downshifting by n speed positions (n is an odd number equal to or larger than 3) has occurred, but otherwise to inhibit execution of the delay control and permit execution of the pre-shift control.

16. The automatic transmission according to claim 1, wherein a plurality of odd-numbered speed positions are set by one of said plurality of first transmission gear trains and said plurality of second transmission gear trains, and a plurality of even-numbered speed positions are set by the other of said plurality of first transmission gear trains and said plurality of second transmission gear trains, respectively, and wherein said pre-shift control execution means further includes second permission means for performing, in a case where the motive power fluctuation-causing conditions are satisfied, to permit execution of the delay control when a down-shifting speed position change demand for downshifting by n speed positions (n is an odd number equal to or larger than 3) has occurred, but otherwise to inhibit execution of the delay control and permit execution of the pre-shift control.

* * * * *